May 14, 1935.    F. H. ANDERBERG    2,001,233
TIRE INFLATER
Filed Sept. 6, 1934    2 Sheets-Sheet 1
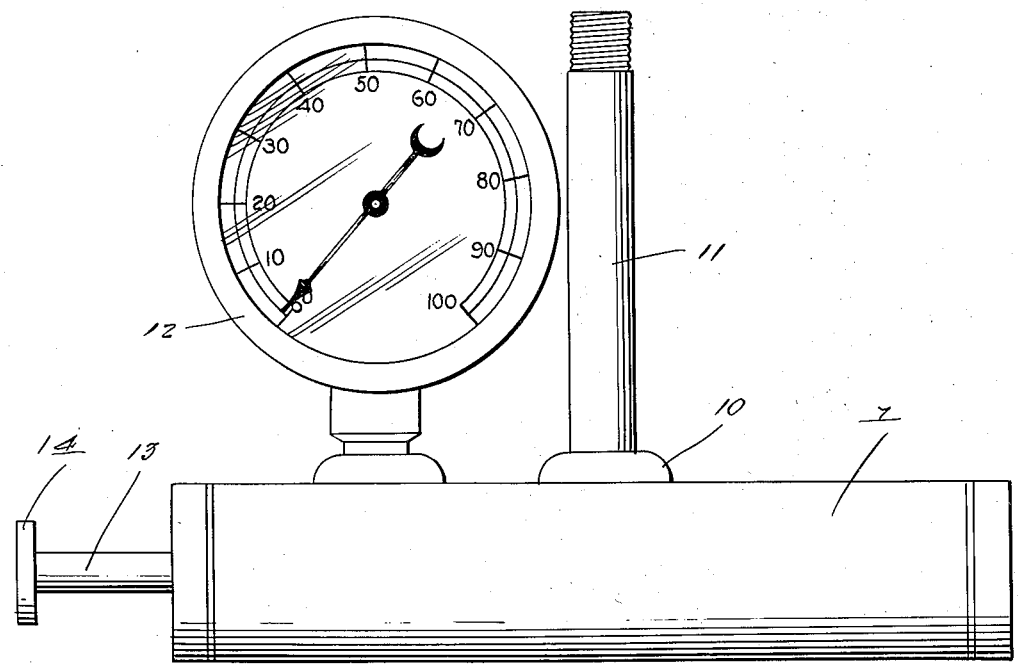
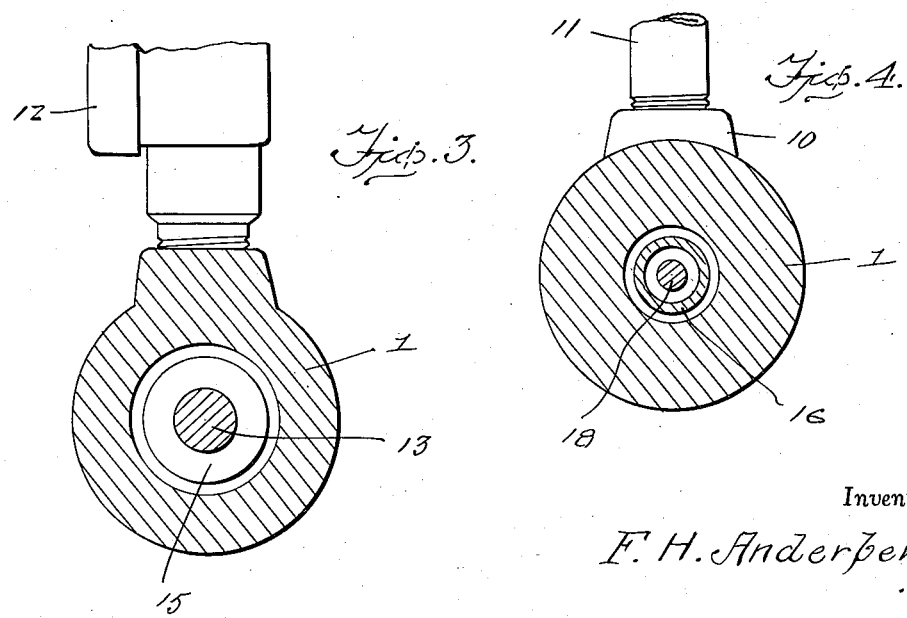
Inventor
F. H. Anderberg
By Clarence A O'Brien
Attorney May 14, 1935.  F. H. ANDERBERG  2,001,233
TIRE INFLATER
Filed Sept. 6, 1934   2 Sheets-Sheet 2
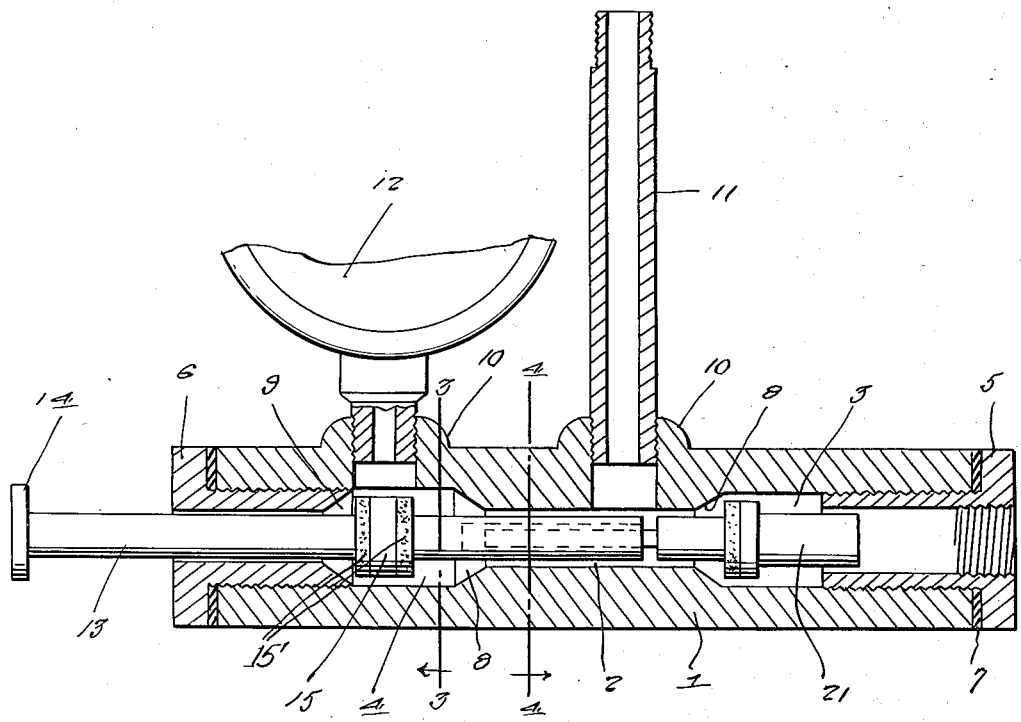
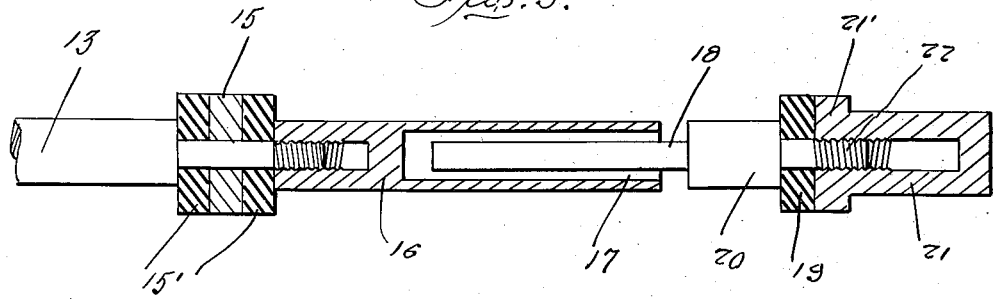
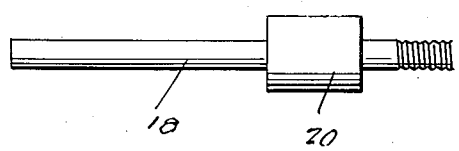
Inventor
F. H. Anderberg
By Clarence A. O'Brien
Attorney Patented May 14, 1935

2,001,233

UNITED STATES PATENT OFFICE 2,001,233

TIRE INFLATER

Fritz H. Anderberg, Centerville, S. Dak.

Application September 6, 1934, Serial No. 743,000

1 Claim. (Cl. 277—20)

This invention relates to a device for inflating tires and the like, the general object of the invention being to provide a manually controlled device for admitting air into a tire from a compressor, means for permitting the escape of air when the tire is overinflated and means indicating the amount of air in the tire.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevational view of the device.

Figure 2 is a longitudinal sectional view thereof.

Figure 3 is a section on the line 3—3 of Figure 2.

Figure 4 is a section on the line 4—4 of Figure 2.

Figure 5 is a longitudinal section of the valves and their stems.

Figure 6 is a view of the floating valve.

In these drawings the numeral 1 indicates an elongated tubular body of the device, the bore of which is formed with the small intermediate part 2 and the enlarged end parts 3 and 4, the outer portions of these end parts having their walls threaded to receive the headed bushings 5 and 6, gaskets 7 being placed between the ends of the body and the heads of said bushings. At the juncture of the small part of the bore with the enlarged portions tapered valve seats 8 are formed and the bushing 6 has its inner end forming a tapered seat 9. The bushing 5 is threaded to receive a pipe leading to an air compressor and internally threaded bosses 10 are formed on intermediate parts of the body one receiving the tube 11 which is to receive a hose having a chuck and its outer end for engaging a threaded part of the valve stem of the tube and the other boss receiving the threaded tubular part of a gauge 12. The tube 11 is in communication with the small part 2 of the bore while the gauge is in communication with the large part of the bore as shown in Figure 2. A hand operated stem 13 passes through the bushing 6 and has a disk 14 on its outer end and its inner end is reduced and its extremity threaded, the reduced part receiving the double valve 15 composed of two resilient disks 15' separated by a metal disk 15'' or the like. A bar 16 has a threaded socket at one end which receives the threaded part of the reduced portion of the stem 13 and acts to hold the double valve 15 while the other end of said bar has an elongated socket 17 therein which loosely receives a floating stem 18 of a valve 19, this valve also being formed of resilient material held between an enlarged part 20 of the stem 18 and a socketed member 21 which is threaded to a reduced outer end of the stem 18 as shown at 22 in Figure 5.

As it will be seen when the bushing 5 is connected to a compressor or other source of fluid under pressure, this pressure acting on the socketed member 21 which is flanged as at 21' to provide a seat for the valve 19, a part connected to the stem 13 will be moved to the left in Figure 2 so that the valve 19 will engage the seat 8 and thus prevent loss of air or other fluid from the compressor or the like. When the device is to be used the usual chuck which is connected to the tube 11 is placed over the valve stem of a tire and the stem 13 pressed inwardly which will press the disk 15' at the right upon the seat 8 and force the valve 19 from its seat 8 so that air can flow from the compressor through the tube 11 and the hose and chuck into the tire. When the operator thinks there has been enough air introduced into the tire he releases the stem 13 so that the pressure will close the valve 19 and the back pressure from the tire will close the left hand disk 15' against the seat 9 and thus the gauge will indicate the amount of pressure in the tire. If there is too much air in the tire the stem 13 is again pressed into the body but only so far as to move the valve 15 at the left out of the seat 9 so that the excessive pressure can escape from the tire through the device but during this operation the valve 19 will remain on the seat 8 as there is sufficient play between the walls of the part 17 and part 16 to permit this movement without causing the valve 19 to leave the seat.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A multiple valve comprising a body having a central longitudinal bore therein and chambers in each end thereof communicating with said bore, valve seats formed in each end of said bore, a bushing extending into one of said chambers and having a valve seat formed in the inner end thereof, a rod slidable in the bushing and into the chamber and having a valve on the inner end thereof cooperable with the valve seat in the bore and the valve seat on the free end of the bushing, a tubular member secured to the inner end of said valve and extending into the longitudinal bore, a stem slidable in said tubular member and a valve on said stem cooperable with the other valve seat of the longitudinal bore.

FRITZ H. ANDERBERG.